United States Patent [19]

Orthman

[11] 4,365,674
[45] Dec. 28, 1982

[54] TANDEM DISC ROW MARKER

[75] Inventor: Henry K. Orthman, Lexington, Nebr.

[73] Assignee: Orthman Manufacturing Co., Inc., Lexington, Nebr.

[21] Appl. No.: 230,389

[22] Filed: Feb. 2, 1981

[51] Int. Cl.³ .................... A01B 69/02; A01B 17/00
[52] U.S. Cl. .................................. 172/126; 172/382; 172/574
[58] Field of Search ................. 172/126–132, 172/195, 574, 382

[56] References Cited

U.S. PATENT DOCUMENTS

| | | | |
|---|---|---|---|
| 1,178,765 | 4/1916 | Waterman | 172/382 |
| 2,132,147 | 10/1938 | Criswell | 172/574 |
| 2,725,814 | 12/1955 | Watmough | 172/126 |
| 3,176,779 | 4/1965 | Schneider | 172/126 |
| 3,195,650 | 7/1965 | Watmough | 172/126 |
| 3,601,202 | 8/1971 | Steffe | 172/574 |
| 3,774,690 | 11/1973 | Booth | 172/126 |
| 4,184,551 | 1/1980 | Orthman | 172/26 |
| 4,228,860 | 10/1980 | Orthman | 172/26 |

Primary Examiner—Richard J. Johnson
Attorney, Agent, or Firm—Zarley, McKee, Thomte, Voorhees & Sease

[57] ABSTRACT

A row marker featuring tandem cutting discs, each with convex and concave surfaces, which are disposed to present the convex surfaces to opposite sides of a cutting line. The disc's cutting edges are rotatably adjustable, either individually or as a pair, whereby they can be rotated to widen or narrow the furrow if desired. The cutting edges are set to cut along the same line or overlap slightly at their deepest points. The trailing disc cuts the earth to a deeper point than the lead disc. The depth of the marker furrow can be varied by adjusting a forwardly disposed ground wheel. An extension arm connects the tandem cutting discs to a planter at a selected distance to provide the precise location of the marker furrow. An adjustable joint allows realignment of the cutting edges to insure contact with the soil in a true vertical position when extension arm length is altered.

11 Claims, 7 Drawing Figures

U.S. Patent     Dec. 28, 1982     4,365,674
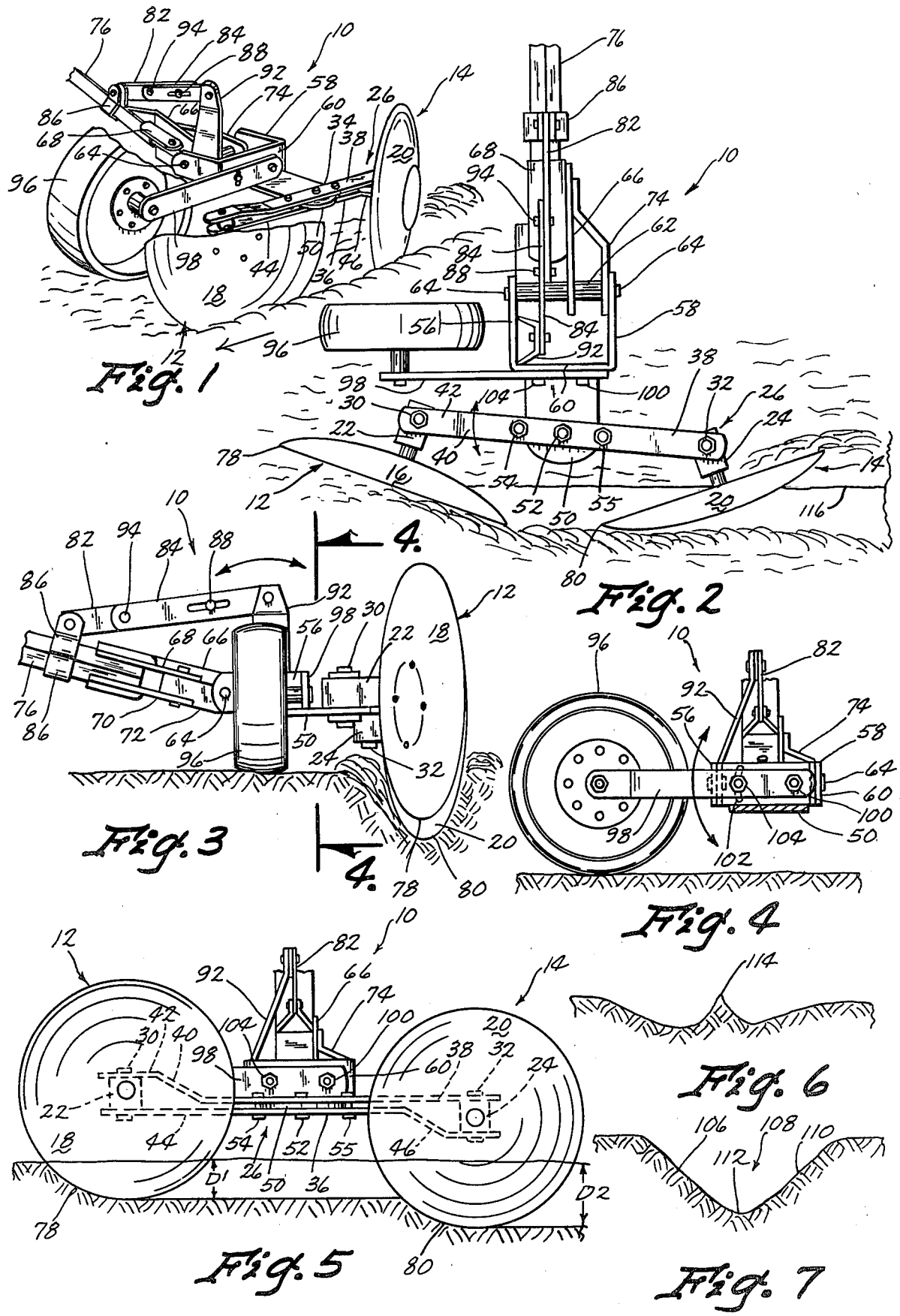

TANDEM DISC ROW MARKER

BACKGROUND OF THE INVENTION

Present furrow marker units employ a single earth working tool, usually a cutting disc. The single disc cutter includes a concave surface on the disc to cut and throw soil away from the planter or, if the disc is reversed, to cut and pull dirt towards the planter. Either method produces a marker furrow with one clean cut side formed by the convex surface and a more pronounced scattering of earth on the opposite side.

This narrow, uneven type of marker furrow has four disadvantages. First, a planter operator following the furrow by visual means alone has great difficulty in following the true center particularly with wider, modern equipment which places the operator further from the marker furrow. Secondly, if tractor or implement automatic guiding mechanisms are employed, conventional marker furrows do not provide sufficient uniform side slopes and bottom for smooth operation. Third, the present trend toward reduced tillage methods requires a more well defined marker furrow than the single disc cutter affords. Crop remnants associated with such reduced tillage methods obscure shallow, narrow or partially formed furrows. Finally, a single disc marker furrow will not stand up to the spring and summer storms to which most farm lands are subjected.

SUMMARY OF THE INVENTION

This invention pertains to an improvement in a row marker. It can be utilized with automatic furrow followers as described in U.S. Pat. Nos. 4,184,551 and 4,228,860. Two cutting discs with oppositely disposed convex surfaces are positioned in tandem and rotatably connected to a tractor or planter by an extension arm. The forward cutting disc is connected to present its convex surface towards the extension arm with its leading edge rotated through an acute angle from the centerline of the marker furrow to be cut towards the extension arm. The trailing disc is connected to the extension arm such that its convex surface faces away from the extension arm with its leading edge rotated through the same acute angle as the forward disc but in the opposite direction.

Each cutting disc is individually rotatable about separate vertical axes, and each is disposed to engage the ground with its cutting edge in a true vertical position. The cutting edges are set to cut along the same line or slightly overlap at their deepest points. Additionally, the cutting discs are connected at opposite ends of a cross bar which is indirectly connected to the extension arm. The discs can be fixed at the ends of the cross bar and the cross bar rotated about a central pivot such that the marker furrow can be narrowed or widened by a single adjustment.

The extension arm incorporates two overlapping leverage arms which engage through bolt and slot arrangements and which allow vertical repositioning of the disc cutting edges when the extension arm length is varied. This insures that the disc cutting edges will always engage the ground in a vertical position. A forwardly disposed ground wheel is adjustably connected to the extension arm such that the height of the arm above the ground can be varied, which in turn allows control of the marker furrow depth. Further, the trailing disc cuts the earth to a greater depth than the forward disc, which allows a more uniform and even marker furrow.

It is an object of this invention to form marker furrows which can be easily followed by operators of modern farm implements.

It is a further object of this invention to form marker furrows which can be accurately followed by commonly used automatic guiding systems.

It is a further object of this invention to provide marker furrows which will withstand normal weather conditions during the planting and harvesting seasons.

Finally, it is a further object of this invention to provide furrow markers which are well defined in minimum or no tillage fields.

BRIEF DESCRIPTION OF THE DRAWINGS

FIG. 1 is a perspective view with one of the tandem discs and depth wheel broken away, showing the relationship of the cutting discs to the extension means and depth wheel.

FIG. 2 is a top view of the tandem disc row marker.

FIG. 3 is a front view of the tandem disc row marker.

FIG. 4 is a sectional side view of the row marker along line 4—4 of FIG. 3.

FIG. 5 is a plan view from the side of the row marker with the earth cut away to show the relative depths of the cutting discs.

FIG. 6 is a marker furrow cross section which results when the tandem discs are improperly adjusted.

FIG. 7 is a marker furrow cross section which results when the tandem discs are properly adjusted.

DETAILED DESCRIPTION OF THE INVENTION

The tandem disc row marker 10 includes cutting discs 12 and 14 of the same dimensions. Discs 12 and 14 are connected to a motive means such as a planter (not shown) which propels row marker 10 forward in the general right to left direction of the arrows in FIGS. 1 and 5. Disc 14 is disposed in a trailing position relative to disc 12 when the row marker 10 is in use. Disc 12 has a convex surface 16 and a concave surface 18 and disc 14 has a convex surface 20 and a concave surface (not shown).

As shown in FIGS. 2 and 5, discs 12 and 14 are secured by stub shafts 22 and 24 to double bar member 26. Stub shafts 22 and 24 are rotatable about bolts 30 and 32, respectively. Double bar member 26 is comprised of an upper bar 34 and lower bar 36 of the same dimensions. The majority of upper bar 34 is a flat section 38 which connects to angled section 40. Angled section 40 ends at a second, offset, flat section 42. Similarly, lower bar 36 includes a large flat section 44, angled section 46 and offset second flat section 48.

Upper bar 34 overlaps lower bar 36 in spaced relationship with offset flat portions 42 and 48 oppositely disposed. Further, said bars are disposed such that flat section 42 is offset upward and flat section 48 is offset downward. Thus, stub shaft 22 is secured between flat section 44 of upper bar 38 and flat section 44 of lower bar 36. Likewise, stub shaft 24 secured between flat section 48 of lower bar 36 and flat section 38 of upper bar 34. The relative placement of stub shafts 22 and 24 due to the configuration of double bar member 26 results in leading disc 12 cutting to depth D1 which is less than the cutting depth D2 of trailing disc 14 (FIG. 5).

Tongue 50 is horizontally disposed and sandwiched between flat portions 38 and 44 of said bars, equidistant from said stub shafts.

Referring to FIGS. 1, 2 and 3, double bar member 26 pivots about central bolt 52. Bolts 54 and 55 join sections 38 and 44 immediately beyond the width of tongue 50 at points between central bolt 52 and discs 12 and 14, respectively. Bolts 54 and 55 further strengthen double bar member 26.

Tongue 50 extends to partially underlie and connect with a U-shaped member. Legs 56 and 58 of the U-shaped member extend horizontally away from double bar 26. Closed end 60 of U-shaped member 54 faces double bar 26 and attaches perpendicular to the top surface of tongue 50.

Sleeve 62, which extends between the ends of legs 56 and 58 parallel to closed end 60, is rotatable about and encases connecting bolt 64. Straight support flange 66 has its forward and rear surfaces, i.e., surfaces which are disposed in the direction of travel and opposite the direction of travel, respectively, vertically disposed, and is fixedly secured to sleeve 62 at a point between leg 58 and the center of sleeve 62. Flange 66 extends horizontally away from sleeve 62 with its forward surface attached to the rear edges of a pair of horizontally disposed, elongated plates 68, 70.

Plates 68 and 70 are of equal dimensions and lie in parallel, spaced relation to one another with plate 68 above plate 70 (see FIG. 3). Brace 72 is fixedly secured to sleeve 62 between flange 66 and the interior surface of leg 56, and is secured between plates 68 and 70. Step flange 74 is fixedly secured to sleeve 62 adjacent to the interior surface of leg 58. Flange 74 extends away from tongue 50 and angles towards and is connected to the rear surface of flange 66 (see FIG. 2).

Tubular extension arm 76 connects to a planter (not shown) and extends to engage and lie between plates 68 and 70 and is spaced apart from brace 72 (see FIG. 3).

Vertical positioning of cutting edges 78 and 80 (FIG. 3) is determined by the rotation of the U-shaped member relative to sleeve 62. Said rotation is controlled by leverage arms 82 and 84. Arm 82 is fixedly attached to clamp 86 (said clamp being clipped around tubular arm 76) and slidably engages arm 84 by passing attached bolt 88 through slot 90. Likewise, arm 84 is fixedly attached to angled brace 92 and slidably engages arm 82 by passing attached bolt 94 through slot (not shown) in arm 82, equal in dimension to slot 90. Angle brace 92 is vertically disposed and secured at its lower end to the interior surface of leg 56 at a point between sleeve 62 and closed end 60.

Referring to FIG. 4, depth wheel 96 is disposed forward of the U-shaped member. Wheel 96 is secured to the face of closed end 60 by arm 98 which is vertically rotatable about bolt 100. The degree of rotation of arm 98 is limited by slot 102 and bolt 104.

In operation, a planter or other motive means is connected to the end of extension arm 76 opposite the tandem disc row marker and row marker 10 is directed along a line perpendicular to the longitudinal axis of extension arm 76. Depth wheel 96 is adjusted for any desired setting by rotating arm 98 upward for a deep cut and downward for a shallower cut. Cutting edges 78 and 80 are placed in a true vertical position with respect to the soil by adjusting the amount of overlap between leverage arms 82 and 84. If the amount of overlap is decreased by mutually extending arms 82 and 84, cutting edges 78 and 80 will be rotated towards the tractor.

By increasing the overlap of arms 82 and 84, cutting edges 78 and 80 will be rotated away from the tractor. In order to cut a uniform furrow, disc 12 is rotated towards the planter through an acute angle from a line perpendicular to the longitudinal axis of extension arm 76. Similarly, disc 14 is rotated through the same acute angle but away from the planter. The positions of the cutting discs 12 and 14 are fixed by securing bolts 30 and 32. If a wider or narrower marker furrow is desired, the angle of rotation is increased or decreased, respectively.

When row marker 10 moves forward, cutting disc 12 engages the soil at a depth D1 as indicated in FIG. 5. Since concave surface 18 of cutting disc 12 is disposed generally away from the planter, dirt is cut and thrown away from the planter, forming one side 110 of a continuously downward sloping marker furrow 108 (FIG. 7). Soil remaining on the convex side 16 of cutting disc 12, is then cut and thrown towards the planter by concave surface of cutting disc 14, which engages the earth at depth D2. The additional cutting depth of the trailing cutting disc 14 assists in clearing out the furrow 108 and forming side 106 of a well defined furrow with a gently rounded bottom 112. Each side of furrow 108 is thus similarly shaped and the furrow is wider than if it had been formed by only one of the discs.

FIG. 7 displays a cross-sectional view of the resultant marker furrow when cutting discs 12 and 14 are properly adjusted. If the cutting edges 78 and 80 are adjusted such that the respective deepest contact points do not cut along the same line or overlap, a peak 114 as indicated in FIG. 6 will occur in the middle of the furrow.

It is thus important to adjust cutting edges 78 and 80 such that said edges cut substantially along the same line 116 (FIG. 2) or slightly overlap at their deepest contact points. This will insure that one, centrally located bottom area 112 will appear in the marker furrow. If the cross-section of FIG. 7 were not obtained, a planter operator will have greater difficulty in locating the true center of the marker furrow and automatic guidance mechanisms (most of which are designed to seek the lowest point of a marker furrow) will temporarily misdirect a tractor or farm implement.

In addition to rotating said discs about bolts 30 and 32, furrow marker width can be varied by rotating double bar member 26 about central bolt 52. Care must be taken, however, to retain the proper alignment of cutting edges 78 and 80 as indicated above. Thus, if double bar member 26 is rotated too far, discs 12 and 14 must be readjusted, or undesirable peak 114 will result.

Clearly, the furrow of FIG. 7 will be easily discerned in reduced tillage fields and will remain defined from planting through cultivation. Thus, the invention accomplishes at least all of its stated objectives.

What is claimed is:

1. A row marker comprising:
   earth working means, including two cutting discs, each disc including a convex surface, a concave surface and a cutting edge having a point of deepest contact with the earth, wherein said discs are disposed in tandem with said cutting edges set to overlap at least to the extent that the cutting line of the trailing deepest point lies substantially in the vertical plane of the cutting line of the lead deepest point,
   extension means operatively connected to said earth working means; and
   motive means operatively connected to said extension means, whereby a marker furrow is formed at a selected location with approximately even sides which slope continuously downward to a single, substantially central bottom area, disc offsetting means secured to said discs whereby the trailing disc will cut the soil to a deeper point than the lead disc, said disc offsetting means including a pair of horizontally disposed bars lying generally along the direction of the furrow to be cut, each bar having a forward and a rear end, with an upper bar overlying a lower bar in parallel, spaced relation, and wherein the forward end of said upper bar is offset up and the rear end of said lower bar is offset down, a forward stub shaft secured between the forward ends of said bars and attached to the center of said lead disc, and a rear stub shaft secured between the rear ends of said bars and attached to the center of the trailing disc.

2. The device of claim 1 further including means for adjustably setting the cutting depths of said edges.

3. The device of claim 2 wherein said adjustable depth cutting means includes a ground engaging wheel disposed forward of said cutting edges, whereby adjustment of the vertical position of said wheel determines the cutting depth of said edges.

4. The device of claim 1 further including means for adjustably and jointly pivoting said discs about a vertical axis lying between said discs.

5. The device of claim 1 further including means for independently and adjustably pivoting each of said cutting discs about a separate vertical axis.

6. The device of claim 1 wherein said deepest contact points cut along lines which lie in the same vertical plane.

7. A row marker comprising, an elongated extension arm having opposite ends, one end being adapted for connection to a ground working vehicle so as to extend transversely from the vehicle generally perpendicular to the longitudinal direction of travel thereof, an elongated frame means, means for mounting said frame means on the opposite end of said extension arm for pivotal movement about a longitudinal axis, said frame means being oriented longitudinally generally perpendicular to said extension arm, a pair of cutting discs, each disc including a convex surface, a concave surface and a cutting edge having a point of deepest contact with the earth, means for supporting said pair of discs on said elongated frame means for rotation about respective generally transverse axes and in longitudinally spaced apart tandem relation so that the cutting edges are set to overlap at least to the extent that the cutting line of the trailing deepest point lies substantially in the vertical plane of the cutting line of the lead deepest point, and means for adjustably setting the pivoted position of said elongated frame means about said longitudinal axis whereby the cutting edges of the discs may be placed in a true vertical position with respect to the soil.

8. The row marker of claim 7 wherein said means for adjustably setting the pivoted position of said elongated frame means comprises an upright brace having a lower end secured to said elongated frame means and an opposite upper end, and a length adjustable leverage arm connected at one end to the upper end of said brace and connected at the opposite end to said extension arm at a position in spaced relation from said elongated frame means.

9. The row marker of claim 7 further comprising means for adjustably setting the cutting depths of said cutting edges including a ground engaging wheel disposed forwardly of said cutting edges whereby adjustment of the vertical position of said wheel determines the cutting depth of said edges.

10. The row marker of claim 7 further comprising means for independently and adjustably pivoting each of said cutting discs about a separate vertical axis.

11. The row marker of claim 7 wherein said elongated frame means includes disc offsetting means secured to said discs whereby the trailing discs cuts the soil to a deeper point than the lead disc.

* * * * *